United States Patent
Jenabzadeh

(10) Patent No.: US 10,120,190 B2
(45) Date of Patent: Nov. 6, 2018

(54) ENTERTAINMENT DEVICE AND METHOD OF COMMUNICATION FOR AN ENTERTAINMENT DEVICE

(71) Applicant: Sony Interactive Entertainment Europe Limited, London (GB)

(72) Inventor: Mandana Jenabzadeh, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 15/340,333

(22) Filed: Nov. 1, 2016

(65) Prior Publication Data

US 2017/0139207 A1 May 18, 2017

(30) Foreign Application Priority Data

Nov. 13, 2015 (GB) .................................. 1520051.2

(51) Int. Cl.
*G09G 5/00* (2006.01)
*G02B 27/01* (2006.01)
(Continued)

(52) U.S. Cl.
CPC ........... *G02B 27/017* (2013.01); *G06F 1/163* (2013.01); *G06F 1/1694* (2013.01);
(Continued)

(58) Field of Classification Search
CPC ...... G02B 27/017; H04W 4/18; H04W 4/008; H04W 4/80; G06F 3/011; G06F 3/014;
(Continued)

(56) References Cited

U.S. PATENT DOCUMENTS

| 2007/0052672 A1 | 3/2007 | Ritter et al. |
| 2013/0127980 A1 | 5/2013 | Haddick et al. |

(Continued)

FOREIGN PATENT DOCUMENTS

| EP | 2827304 A1 | 1/2015 |
| WO | 2015002377 A1 | 1/2015 |

(Continued)

OTHER PUBLICATIONS

Combined Search and Examination Report for Application No. GB1520051.2, dated Mar. 24, 2016.

(Continued)

*Primary Examiner* — Rodney Amadiz

(57) ABSTRACT

An entertainment device includes a virtual environment generator to generate a virtual environment for display. The device also includes reception means to receive content from a mobile communication device on a local network. Content parsing means is adapted to parse the content for information of one or more predetermined information types. And transmission means is adapted to signal to a mobile communication device that the entertainment device is a wearable device, despite the fact that the entertainment device is not a wearable device. The reception means is adapted to receive selected content from the mobile communication device that has been formatted for use by such a wearable device. In addition, information of one or more predetermined information types is incorporated into the virtual environment for display.

11 Claims, 3 Drawing Sheets

(51) Int. Cl.
*G06F 3/01* (2006.01)
*H04B 1/3827* (2015.01)
*H04W 4/18* (2009.01)
*H04L 12/58* (2006.01)
*G06F 1/16* (2006.01)
*H04W 4/80* (2018.01)

(52) U.S. Cl.
CPC ............ *G06F 1/1698* (2013.01); *G06F 3/011* (2013.01); *G06F 3/012* (2013.01); *G06F 3/014* (2013.01); *G06F 3/017* (2013.01); *H04B 1/385* (2013.01); *H04L 51/24* (2013.01); *H04W 4/18* (2013.01); *H04B 2001/3866* (2013.01); *H04W 4/80* (2018.02); *H05K 999/99* (2013.01)

(58) Field of Classification Search
CPC ...... G06F 3/012; G06F 1/1698; G06F 1/1694; G06F 3/017; G06F 1/163; H04B 1/385; H04B 2001/3866; H04L 51/24; H05K 999/99
See application file for complete search history.

(56) References Cited

U.S. PATENT DOCUMENTS

| | | |
|---|---|---|
| 2014/0063055 A1 | 3/2014 | Osterhout et al. |
| 2014/0085316 A1 | 3/2014 | Narayanan |
| 2015/0128292 A1 | 5/2015 | Malecki et al. |
| 2015/0169049 A1 | 6/2015 | Ko et al. |
| 2015/0206329 A1 | 7/2015 | Devries |
| 2016/0345124 A1 | 11/2016 | Ahn |

FOREIGN PATENT DOCUMENTS

| | | |
|---|---|---|
| WO | 2015026030 A1 | 2/2015 |
| WO | 2015108241 A1 | 7/2015 |

OTHER PUBLICATIONS

Extended European Search Report for Application No. 16193556.4 dated Mar. 16, 2017.
Examination report for EP Application No. 16193556.4 dated Jul. 18, 2018.

ENTERTAINMENT DEVICE AND METHOD OF COMMUNICATION FOR AN ENTERTAINMENT DEVICE

CROSS REFERENCE TO RELATED APPLICATIONS

The present application claims the benefit of and priority to GB Application No. 1520051.2, filed Nov. 13, 2015, the entire disclosure of which is incorporated by reference herein.

BACKGROUND OF THE INVENTION

Field of the Invention

The present invention relates to a communication method and device.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the recent announcement of head-mounted displays (HMDs) such as Sony's® so-called Project Morpheus head-mounted display, a videogame or media consumer can be immersed within a virtual environment, or within pre-recorded content, potentially to the exclusion of other distractions.

However on occasion this may result in a user missing important information, for example by failing to hear a notification from their telephone, or conversely it may result in the user having to extract themselves from the head-mounted display in order to check the notification (which may be inconvenient depending on what is happening in the videogame or media), or result in wasted time, depending on the importance and frequency of the notifications.

A Bluetooth® in-car style connection to head-mounted display may be considered, to enable a user to make and receive calls whilst wearing the head-mounted display, but this is of limited functionality.

The present invention is intended to mitigate or alleviate this problem.

SUMMARY OF THE INVENTION

In a first aspect, an entertainment device is provided in accordance with claim 1.

In another aspect, a system is provided in accordance with claim 8.

In another aspect, a method of communication is provided in accordance with claim 9.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
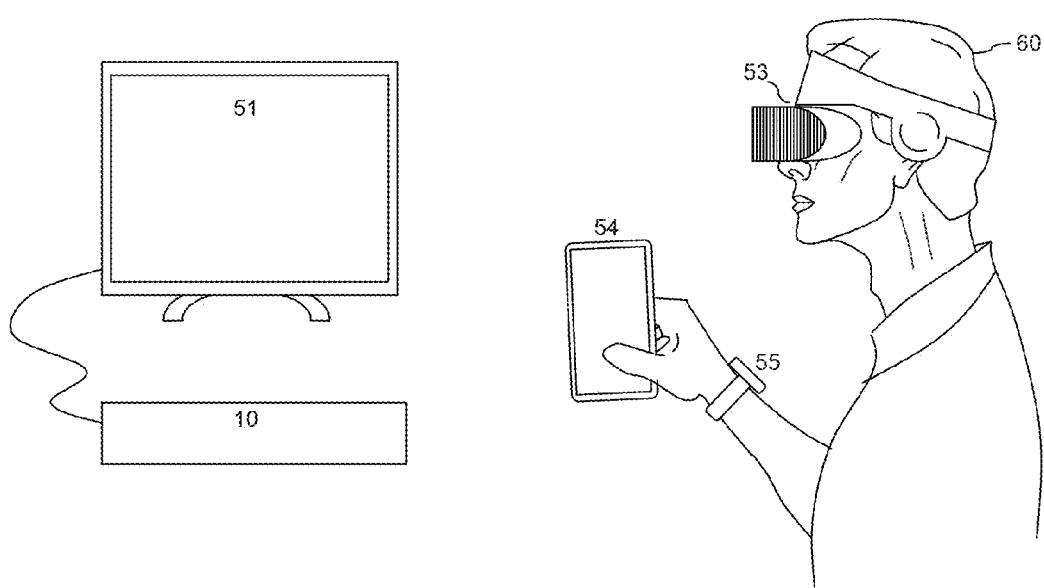
FIG. 1 is a schematic diagram of an entertainment device interacting with one or more peripherals in accordance with an embodiment of the present invention.

Referring now to the drawings, wherein like reference numerals designate identical or corresponding parts throughout the several views, a communication method and device are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring now to FIG. 1, in an embodiment of the present invention an entertainment device such as a Sony® PlayStation 4® 10 is operably coupled to a television screen 51, and also operably coupled, either by a wire (not shown) or wirelessly to head-mounted display (HMD) 53 worn by a user 60.

In addition, the user owns a mobile communication device 54 (such as a mobile phone, tablet or other portable communication device, hereafter collectively and generically termed a 'mobile phone' 54), and optionally also a so-called wearable device 55, such as a so-called 'smart watch'.

Figure 2:
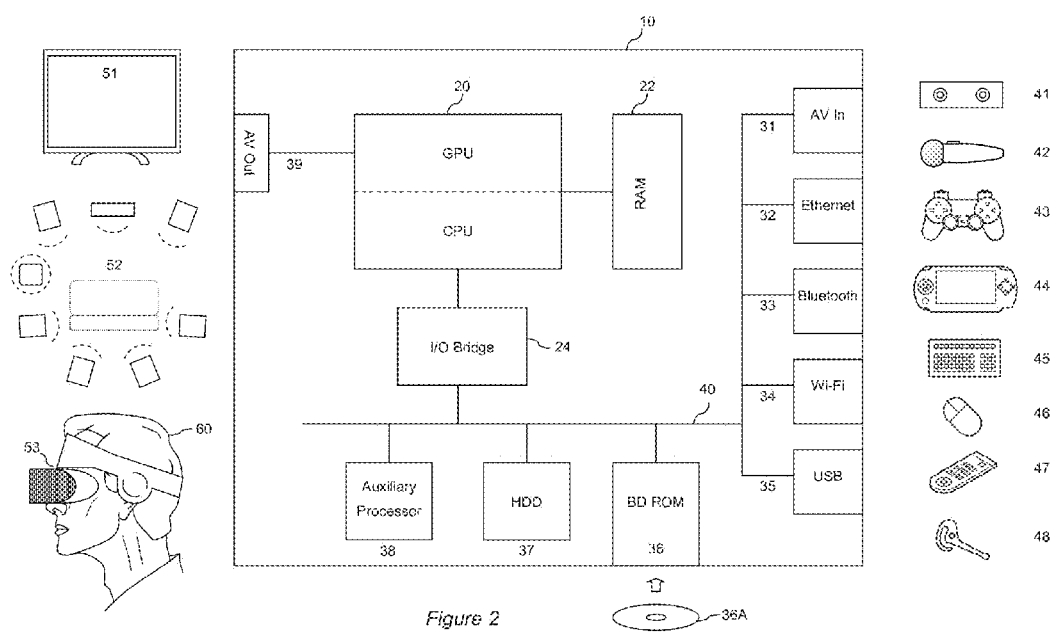
FIG. 2 is a schematic diagram of an entertainment device in accordance with an embodiment of the present invention.

In more detail, referring to FIG. 2 this schematically illustrates the overall system architecture of the Sony® PlayStation 4® entertainment device. The system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to the television 51. Where supported by the television, the video may be stereoscopic. The audio may be presented to a home cinema system 52 in one of a number of formats such as stereo, 5.1 surround sound or 7.1 surround sound. Video and audio may likewise be presented to the head-mounted display unit 53 worn by the user 60.

In operation, the entertainment device may default to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In an embodiment of the present invention, the entertainment device is operable to generate a virtual environment for display, for example to a television or a head-mounted display. Such a virtual environment typically comprises a mesh of polygons positioned within a virtual world coordinate system, and decorated with graphical textures to give the desired appearance of the virtual world. A view of the virtual environment is then generated for display by capturing a viewpoint of the virtual environment using a virtual camera.

In an embodiment of the present invention, the entertainment device 10 comprises reception means such as Bluetooth® 33 or Wi-Fi® 34, adapted (in conjunction with APU 20 operating under suitable software instruction) to receive in operation content that has been formatted for a wearable device.

It will be appreciated that such content will be formatted according to standard application programming interfaces (APIs) and communication protocols, typically for one popular type of wearable device. Current examples of APIs include those for Android Wear® as used by Sony® smart watches, Apple Watch® and Pebble®, whilst the communication protocols are typically a low-power Bluetooth® variant or a low-power Wi-Fi® variant such as Wi-Fi Direct.

In addition, other communication protocols and schemes may be incorporated within these communications or may run parallel to these communications, such as those of the digital living network alliance (DLNA) standard. DLNA is a widely adopted standard for sharing data over a home network. Typically the data is media data such as still images, video or audio, although text is also possible. In a DLNA setup, the media source operates as a server, and the media's recipient operates as a client. Whilst DLNA packages media data from a server for delivery, this may not guarantee that the client is able to recognise the media. For example, some client devices may not recognise or not be capable of decoding a particular file type for an MP4 video file transmitted using the DLNA standard, even though it successfully receives the file using the DLNA standard.

It will also be appreciated that typically wearable devices comprise small screens. Consequently content is typically reformatted to suit the screen size of the wearable device, at the same time also reducing the bandwidth of data transmitted/received, thereby saving battery life for the wearable device.

For example, a Sony® SmartWatch 3 has a rectilinear screen with a resolution of 320×320 pixels. Meanwhile the Moto 360® watch has a substantially circular screen with a resolution of 92 or 104 pixels per centimeter, depending on screen size. The devices themselves are typically in the order of 3 or 4 cm in diameter.

Accordingly, extraneous data is typically not displayed where possible because there is relatively little room on-screen. For example, when a text is received by a mobile phone and relayed to the wearable device, the senders name may be included in a predetermined colour to differentiate it from the main text, in order to avoid including the word 'from' on the display. This increases the chance that the senders name will only occupy only one line of text on screen. Similarly, text formatting may be limited to plaintext and/or a predetermined font in order to maximise the amount of text that can be displayed on screen in a manner that is comfortable to read. Optionally, where a text message or an email exceeds a certain length or comprises certain embedded objects, the message as sent to the wearable device may comprise only a summary version comprising the identification of the sender, and the first few lines of the message, whilst not treating the message as being read on the mobile phone. The assumption in this case is that, having been made aware of the text/email via the wearable device, the user can hand off to the mobile phone for the complete version.

Other examples of parsimonious interface design will be apparent to the skilled person.

Similarly, still images and video may be down-sampled to a suitable resolution before transmission to the wearable device. Typically the dimensions (in pixels) of the wearable device display and potentially its shape have been previously communicated to the mobile phone, which is then able to select a suitable size for the down-sampled version, based on these dimensions and the aspect ratio of the content being down-sampled.

The format in which any such content is encapsulated for the wearable device may either be a default of the API/protocol in the case that the wearable device does not provide sufficient details of its capabilities, or may be selected in response to preferences indicated by the wearable device in advance.

In an embodiment of the present invention, the entertainment device 10 comprises transmission means such as Bluetooth® wireless link 33 or WiFi® wireless link 34 adapted (in conjunction with APU 20 operating under suitable software instruction) to signal to a mobile phone 54 that the entertainment device is a wearable device, despite the entertainment device not being a wearable device.

Consequently the entertainment device receives content formatted for a wearable device because the mobile phone 54 has been informed that the entertainment device is a wearable device and communicates with it accordingly.

The entertainment device then receives content from the mobile phone that has been formatted for use by such a wearable device. Exactly which wearable device the entertainment device declares itself to be is a design decision, or a standards compliant generic wearable device may be indicated in an attempt to maximise compatibility between the entertainment device and a mobile phone operating according to the particular standard.

Alternatively or in addition, in an embodiment of the present invention the entertainment device comprises transmission means such as Bluetooth® wireless link 33 or WiFi® wireless link 34 adapted (in conjunction with APU 20 operating under suitable software instruction) to communicate with a wearable device 55.

In this case, typically the wearable device comprises an app arranged in operation to forward content received by the wearable device from the mobile phone 54 to the entertainment device 10.

It will be appreciated that this arrangement may be suitable in those cases where the user already owns a real wearable device 55 that is in communication with their mobile phone 54. However, where the mobile phone supports communication to multiple wearable devices, then either technique for conveying content from the mobile phone to the entertainment device may be used, either separately or in combination.

In an embodiment of the present invention, the entertainment device 10 comprises content parsing means, adapted to parse the content for one or more predetermined information types.

As noted above, data sent by a mobile phone to a wearable device is typically formatted to be of low bandwidth and of a format adhering to either a default set by a particular wearable standard or a preferred format corresponding to a particular wearable device, whether explicitly indicated or assumed by default.

The entertainment device is adapted to parse received content, both to identify one or more predetermined information types, and as appropriate to extract the content of one or more particular types.

It will be appreciated that the entertainment device may emulate some or all of a standards-compliant wearable device, at least to an extent appropriate to provide suitable signals to the mobile phone if desired and to parse received content in a manner consistent with a wearable device.

In an embodiment of the present invention, the predetermined information types are one or more selected from a list consisting of:

i. A text notification;
  ii. a status change notification;
  iii. a still image;
  iv. audio; and
  v. video.

A text notification may take the form of text from a short message service (SMS) communication, text from a multimedia message service (MMS) communication, text from an email, text from an instant messaging application, text from a notification generated by an application resident on the mobile phone, such as a social media app, calendar app, alarm app, media player app or the like, or a system message such as notification of low battery on the mobile phone or a need to update an app or other data on the mobile phone.

A status change notification may take the form of a system message between the mobile phone and the wearable device, such as for example a wake-up message, a switch to standby message, select app message, or a request to transmit data such as GPS, heart rate etc., information.

A still image may take the form of any supported image format, typically but not necessarily down-sampled to a resolution suitable to the wearable device. The still image may comprise meta data indicating whether the image is to be displayed in a landscape or portrait orientation on the device, and may similarly comprise title/author etc., meta data, which in turn may separately be interpreted as a text notification, for example to allow the user to decide whether or not to view the image.

Audio may take the form of any supported audio format, either as a file or as a stream. Example content may include music or a received phone call, or a notification sound indicating one or more types of notice. The audio may comprise title/artist etc. meta data, which in turn may optionally be separately interpreted as a text notification as described above. Similarly the audio may comprise still image meta data such as an album cover, which in turn may optionally be separately interpreted as a still image as described above.

Likewise, video may take the form of any supported audio format, either as a file or as a stream. The audio may comprise title/artist etc. meta data, which in turn may optionally be separately interpreted as a text notification as described above.

It will also be appreciated that audio and video may be included together in a combined file or combined stream.

Having received content and parsed it for information of one or more predetermined information type, the entertainment device is operable to incorporate such information into the virtual environment for display.

Hence for example, information of a text notification type maybe incorporated into a display of a virtual wearable device, in turn incorporated into the virtual environment. Typically the virtual wearable device would be mounted on an arm of a user's avatar. The arm may move responsive to the user's own movements, in a case where the user's own movements are being monitored and replicated, for example via a video camera 41 operably coupled to the entertainment device 10. If the user is wearing a real wearable device 55, this may provide accelerometer/gyroscopic information to the entertainment device to assist with tracking the user's arm and/or the specific pose of the watch on the user's arm. Hence, for example, the entertainment device may estimate the position of the user's arm using video images, but use accelerometer/gyroscopic information from the wearable device to refine the angle of tilt of the user's arm, and/or model where the wearable device's display is pointing. This helps maintain a consistent kinaesthetic sense for the user.

Alternatively or in addition, the arm may have a predefined animation bringing the arm and hence also the virtual wearable device into users field-of-view when information of a text notification type is received.

Similarly, status change information may also be incorporated into the display on the virtual wearable device so that the user is unambiguously informed of the information.

Meanwhile, for example, information of a still image information type or a video information type maybe incorporated into a virtual display object within the virtual environment. Hence they may appear on a virtual billboard, poster, or photo frame, or a virtual television or monitor within the virtual environment.

Meanwhile audio information may be associated with a virtual audio object such as a telephone, record player, or rock band, or where it is provided in association with video information then it may similarly be associated with the same virtual display object. In this case, the association may take the form that playback of the audio is triggered by the user's proximity to the virtual audio object, or triggered by specific interaction with virtual the audio object (for example, picking up the virtual telephone). Optionally, audio notifications (for example, sounds with a duration in the order or 0.1-1.5 seconds) may simply be played to the user without the need for an associated virtual object. Conversely, sounds exceeding a predetermined duration (for example in the range 5-30 seconds), or steaming sounds, may always require an associated virtual audio object.

Optionally, depending on the type of audio received (for example music versus incoming telephone call), the virtual audio object may be positioned within the virtual environment to activate or encourage activation of the audio information. For example, the previously mentioned virtual arm may have a predefined animation bringing the arm into user's field-of-view when an incoming phone call is received, and it may display a selectable icon with which the user can choose to answer the call, as well as any suitable meta data identifying the caller.

Notably, some wearable APIs/protocols allow a wearable to act as a proxy loudspeaker and microphone for a smart phone; consequently the entertainment device can receive audio from the telephone and transmit audio received from a microphone, for example a microphone incorporated into the head-mounted display or into the video camera, in order to conduct the phone call.

It will be appreciated that the above examples are non-limiting. For example, meta data associated with a video and incorporated as a text notification may be displayed on a ticker underneath a billboard in the virtual environment, if this is where the video is being shown; conversely, a still or video image may be displayed on the virtual wearable device. As noted above telephone audio may be relayed through the virtual wearable device, but so may any other audio if desired.

Other suitable combinations of information types and environmental features will be apparent to the skilled person.

Notably in the above embodiments, information output from the users' mobile phone 54, either directly or indirectly to the entertainment device, is incorporated into the virtual environment in a manner that is physically consistent with the environment, rather than, for example, overlaying text directly on the screen.

This is particularly advantageous when the head-mounted display is stereoscopic and provides a great sense of immersion, typically causing the user to be looking into the middle distance; having text or other information seem to appear in mid-air, or appear monoscopically in front of the stereoscopic view, can be highly disruptive and alarming.

It will be appreciated that one or more of the predetermined information types mentioned herein may be received by the entertainment device using the digital living network alliance communication (DLNA) standard.

It will be appreciated that where a user's wearable device 55 comprises an application arranged to forward data on to the entertainment device, then the entertainment device 10 may form a system in conjunction with the wearable device 55, that system then interacting with the user's mobile phone 54 and optionally also with a head-mounted display 53.

The embodiments as described previously herein have used the case of a mobile phone and a wearable device as examples, but it will be appreciated that the invention is not limited to these.

More generally, in an embodiment of the present invention the entertainment device may obtain content from any suitable device on a local network. Typically the local network may be ad hoc, for example when a device such as a wearable device or mobile phone come within range of the entertainment device to use Bluetooth® or Wi-Fi Direct®, or the local network may be a home network comprising a local router to connect one or more other devices within the user's accommodation (i.e. personal or business premises that they own or rent). For the purposes of the present invention, the entertainment device is not receiving this content directly from the wider, external Internet, even if the local device it does receive content from (such as a mobile phone) does originally receive that content via the external Internet (for example in the case of a social media message received by a mobile phone via mobile data). In other words, it receives the content data from a second device on the local network that itself can be the end-user/consumer of that content data, in those cases where the data originates elsewhere and not with the second device itself.

As noted previously, such content may be conveyed to the entertainment device via a standard that supports disparate devices (such as, potentially, a fire alarm, security alarm, or doorbell; an oven, washing machine or dishwasher coming to the end of its cycle; a stereo, MP3 player, network addressable storage (NAS) box or other media source, and as noted previously mobile phones, tablets and wearable devices). An example of such a standard is the Digital Living Network Alliance standard (DLNA®), as described previously.

Hence whilst as previously described herein, the reception means of the entertainment device may be adapted to receive in operation content that has been formatted for a wearable device, more generally the reception means of the entertainment device is adapted to receive in operation content from a second device on a local network; typically that content has been formatted for use with the Digital Living Network Alliance standard, and/or that content has been formatted for a wearable device.

Figure 3:
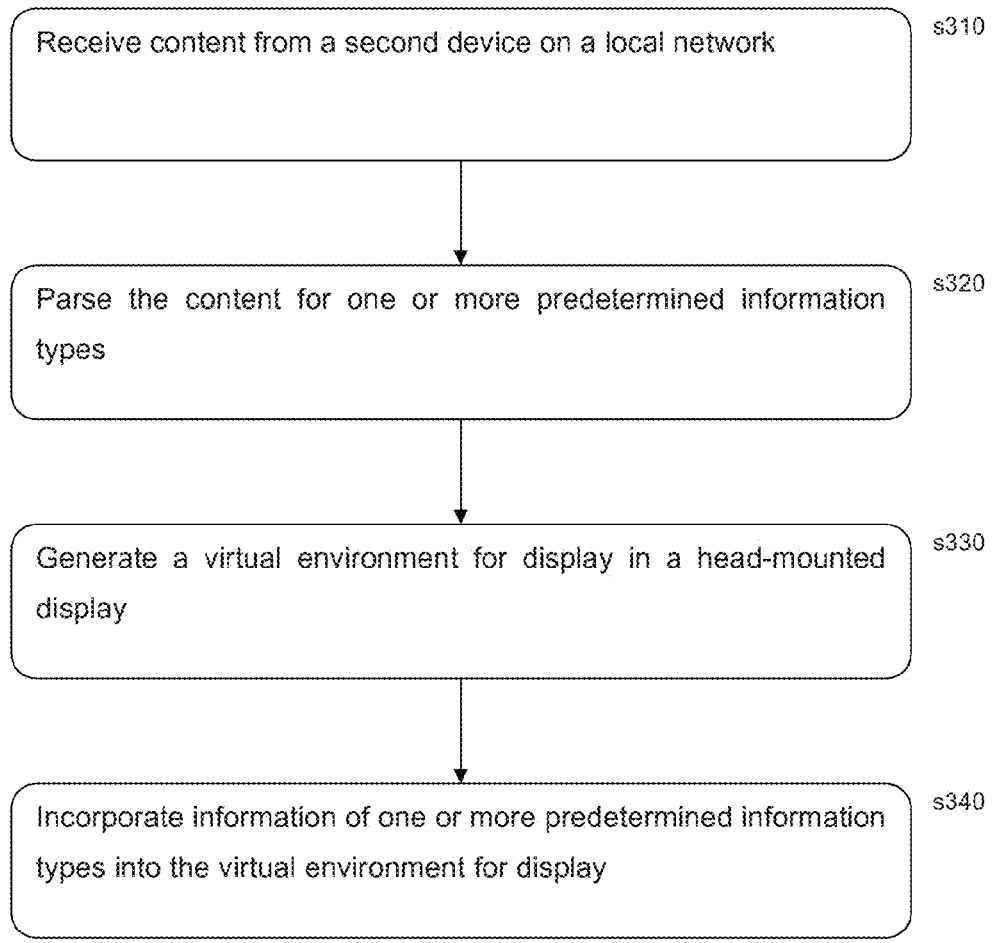
FIG. 3 is a flow diagram of a method of communication in accordance with an embodiment of the present invention.

Referring now to FIG. 3, a method of communication for an entertainment device comprises:
  in a first step 310, receiving content from a second device on a local network;
  in a second step 320, parsing the content for one or more predetermined information types;
  in a third step 330, generating a virtual environment for display in a head-mounted display; and
  in a fourth step 340, and incorporating information of one or more predetermined information types into the virtual environment for display.

It will be apparent to a person skilled in the art that variations in the above method corresponding to operation of the various embodiments of the apparatus as described and claimed herein are considered within the scope of the present invention, including but not limited to:
  the step of receiving content comprises receiving content from a second device on a local network formatted for use with the Digital Living Network Alliance standard;
  the step of receiving content comprises receiving content from a second device on a local network that has been formatted for a wearable device;
  signalling to a mobile communication device that an entertainment device is a wearable device, despite the entertainment device not being a wearable device, and wherein the receiving step comprises receiving content from the mobile communication device that has been formatted for use by such a wearable device;
  communicating with a wearable device, and wherein the receiving step comprises receiving content forwarded by the wearable device from a mobile communications device;
  the predetermined information types being one or more selected from a list consisting of a text notification, a status change notification, a still image, audio, and video;
  information of a text notification type being incorporated into a display of a virtual watch, in turn incorporated into the virtual environment; and
  information of a still image information type or a video information type being incorporated into a virtual display object within the virtual environment.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An entertainment device, comprising
one or more processing devices configured to generate a virtual environment for display;
reception means, adapted to receive, in operation, content from a mobile communication device on a local network;
one or more processing devices configured to parse the content for information of one or more predetermined information types; and
transmission means adapted to signal to a mobile communication device that the entertainment device is a wearable device, despite the entertainment device not being a wearable device;
and wherein the reception means is adapted to receive selected content from the mobile communication device that has been formatted for use by such a wearable device, and
information of one or more predetermined information types is incorporated into the virtual environment for display.

2. An entertainment device according to claim 1, in which:
the reception means is adapted to receive, in operation, the content from the mobile communication device on the local network, formatted for use with a Digital Living Network Alliance standard.

3. An entertainment device according to claim 1, further comprising transmission means adapted to communicate with a wearable device;
and wherein the reception means is adapted to receive content forwarded by the wearable device from the mobile communications device.

4. An entertainment device according to claim 1, in which the predetermined information types are one or more selected from a list consisting of:

i. a text notification;
ii. a status change notification;
iii. a still image;
iv. audio; and
v. video.

5. An entertainment device according to claim 1, in which information of a text notification type is incorporated into a display of a virtual watch, in turn incorporated into the virtual environment.

6. An entertainment device according to claim 1, in which information of a still image information type or a video information type are incorporated into a virtual display object within the virtual environment.

7. An entertainment device according to claim 1, in which the one or more processing devices configured to generate the virtual environment for display are operable to generate the virtual environment for display on a head-mounted display.

8. A system, comprising:
an entertainment device according to claim 1; and
a wearable device.

9. A method of communication for an entertainment device on a local network, comprising the steps of:
signaling to a mobile communication device that the entertainment device is a wearable device, despite the entertainment device not being a wearable device;
receiving content from the mobile communication device on the local network;
parsing the content for one or more predetermined information types;
generating a virtual environment for display in a head-mounted display; and
incorporating information of one or more predetermined information types into the virtual environment for display;
wherein the receiving step comprises receiving selected content from the mobile communication device that has been formatted for use by a wearable device.

10. A method according to claim 9, in which:
the step of receiving content comprises receiving the content from the mobile communication device on the local network, formatted for use with a Digital Living Network Alliance standard.

11. A non-transitory computer readable medium having computer executable instructions adapted to cause a computer system to perform the steps of:
signaling to a mobile communication device that the entertainment device is a wearable device, despite the entertainment device not being a wearable device;
receiving content from the mobile communication device on a local network;
parsing the content for one or more predetermined information types;
generating a virtual environment for display in a head-mounted display; and
incorporating information of one or more predetermined information types into the virtual environment for display;
wherein the receiving step comprises receiving selected content from the mobile communication device that has been formatted for use by such a wearable device.

* * * * *